(12) United States Patent
Zulu (10) Patent No.: US 10,221,981 B1
(45) Date of Patent: Mar. 5, 2019

(54) UNIVERSAL HIGH-SPEED ROTARY UNION (71) Applicant: Joshua Zulu, Germantown Hills, IL (US)

(72) Inventor: Joshua Zulu, Germantown Hills, IL (US)

(*) Notice: Subject to any disclaimer, the term of this patent is extended or adjusted under 35 U.S.C. 154(b) by 0 days.

(21) Appl. No.: 16/165,133

(22) Filed: Oct. 19, 2018

Related U.S. Application Data (60) Provisional application No. 62/643,387, filed on Mar. 15, 2018.

(51) Int. Cl.
F16L 39/04 (2006.01)

(52) U.S. Cl.
CPC .................... F16L 39/04 (2013.01)

(58) Field of Classification Search
CPC .............................................. Y10T 137/86268
See application file for complete search history.

(56) References Cited

U.S. PATENT DOCUMENTS

| | | | |
|---|---|---|---|
| 3,002,769 | A | 10/1961 | Deubler et al. |
| 4,964,433 | A | 10/1990 | Marietta |
| 5,022,686 | A | 6/1991 | Heel et al. |
| 5,303,959 | A | 4/1994 | Medsker |
| 6,029,695 | A | 2/2000 | Logan |
| 6,508,472 | B2 | 1/2003 | Omiya et al. |
| 6,530,397 | B2 | 3/2003 | Suzuki et al. |
| 6,726,215 | B2 | 4/2004 | Uesugi et al. |
| 7,717,473 | B1 * | 5/2010 | Zhang .................. F16L 27/026 285/121.1 |
| 8,047,576 | B2 | 11/2011 | Ford et al. |
| 8,336,921 | B2 | 12/2012 | Takahashi et al. |
| 9,878,377 | B2 | 1/2018 | Short et al. |
| 2014/0241821 | A1 | 8/2014 | Mann et al. |
| 2015/0069751 | A1 * | 3/2015 | Xi ....................... F16L 27/0824 285/272 |
| 2015/0091297 | A1 | 4/2015 | Conroy et al. |
| 2016/0258564 | A1 | 9/2016 | Fukumoto et al. |
| 2017/0051857 | A1 * | 2/2017 | Sakakura ................ F16J 15/34 |
| 2017/0074445 | A1 * | 3/2017 | Kikuyama .............. F16L 39/04 |
| 2018/0058593 | A1 | 3/2018 | Suzuki et al. |

* cited by examiner

Primary Examiner — John Fox
(74) Attorney, Agent, or Firm — Dunlap Bennett & Ludwig PLLC (57) ABSTRACT A universal high-speed rotary union including an input manifold having passageways, an input distributor fixedly coupled to the input manifold and having passageways fluidly connected with the passageways of the input manifold, a valve plate fixedly coupled to the input distributor and having passageways aligned with the passageways of the input distributor, an output manifold rotatably coupled to the input manifold by a first bearing and having passageways and an internal housing; an output receiver slidably coupled to and disposed within the internal housing of the output manifold, and having passageways aligned with the passageways of the output manifold, a bore defined along a common axis of the input manifold, the input distributor, the valve plate, the output manifold, and the output receiver, and a shaft rotatably coupled within the bore by at least a second bearing. The valve plate and the output receiver have a metal to metal interface.

10 Claims, 10 Drawing Sheets

UNIVERSAL HIGH-SPEED ROTARY UNION

CROSS-REFERENCE TO RELATED APPLICATION

This application claims the benefit of priority of U.S. provisional application No. 62/643,387, filed Mar. 15, 2018, the contents of which are herein incorporated by reference.

BACKGROUND OF THE INVENTION

The present invention relates to dynamic sealing technology and rotary union assemblies used to transmit low or high-pressure fluid between two or more stationary or counter-rotating assemblies.

Dynamic sealing technology and rotary union assemblies are designed for transmitting fluids between rotating assemblies. In a typical single or multiple passage assembly, fluid transfer between input manifold and output manifold is transmitted radially before being discharged axially or vice versa. Passages are separated by high pressure radial seals. The seals are typically part of the input or output manifold assembly. Seal cavities are machined inside one manifold. Provision is typically made for draining excess fluid from seal leakage. Excess fluid is used for lubricating bearings and friction surfaces. Bearings mounted between the input manifold and output manifold allow one manifold to rotate relative to the other manifold while transmitting fluid between input and output receiving assemblies. As such, the dynamic speed capability of the union is limited by the heat generated between the radial seals and the fluid receiving manifold. The seal capability is also limited by the temperature capability of the seal materials.

As can be seen, there is a need for a rotary union with components that allow for increased dynamic speed.

SUMMARY OF THE INVENTION

In one aspect of the present invention, a universal high-speed rotary union comprises: an input manifold comprising passageways; an input distributor fixedly coupled to the input manifold and comprising passageways fluidly connected with the passageways of the input manifold; a valve plate fixedly coupled to the input distributor and comprising passageways aligned with the passageways of the input distributor; an output manifold rotatably coupled to the input manifold by a first bearing and comprising passageways and an internal housing; an output receiver slidably coupled to and disposed within the internal housing of the output manifold, and comprising passageways aligned with the passageways of the output manifold; a bore defined along a common axis of the input manifold, the input distributor, the valve plate, the output manifold, and the output receiver; and a shaft rotatably coupled within the bore by at least a second bearing, wherein the valve plate and the output receiver comprise a metal to metal interface.

These and other features, aspects and advantages of the present invention will become better understood with reference to the following drawings, description and claims.

BRIEF DESCRIPTION OF THE DRAWINGS

FIG. 4A-1 is a front view of an input manifold of a high-speed rotary of an embodiment of the present invention;

FIG. 4A-2 is a cross-sectional view of the input manifold taken along line 4A-2 of FIG. 4A-1;

FIG. 4B-1 is a cross-sectional view of the input manifold taken along line 4B-1 of FIG. 4A-1;

FIG. 4B-2 is a cross-sectional view of the input manifold taken along line 4B-2 of FIG. 4A-1;

FIG. 5A-1 is a front view of an input distributor of a high-speed rotary of an embodiment of the present invention;

FIG. 5A-2 is a cross-sectional view of the input manifold taken along line 5A-2 of FIG. 5A-1;

FIG. 5B-1 is a cross-sectional view of the input manifold taken along line 5B-1 of FIG. 5A-1;

FIG. 5B-2 is a cross-sectional view of the input manifold taken along line 5B-2 of FIG. 5A-1;

FIG. 6-1 is a front view of a valve plate of a high-speed rotary of an embodiment of the present invention;

FIG. 6-2 is a cross-sectional view of the valve plate taken along line 6-2 of FIG. 6-1;

FIG. 7-1 is a front view of an output receiver of a high-speed rotary of an embodiment of the present invention;

FIG. 7-2 is a cross-sectional view of the output receiver taken along line 7-2 of FIG. 7-1;

FIG. 8A-1 is a front view of an output manifold of a high-speed rotary of an embodiment of the present invention;

FIG. 8A-2 is a cross-sectional view of the input manifold taken along line 8A-2 of FIG. 8A-1;

FIG. 9B-1 is a cross-sectional view of an output manifold of an embodiment of the present invention illustrating a drain return path; and FIG. 9B-2 is a cross-sectional view of an input distributor of an embodiment of the present invention illustrating a drain return path.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1A:
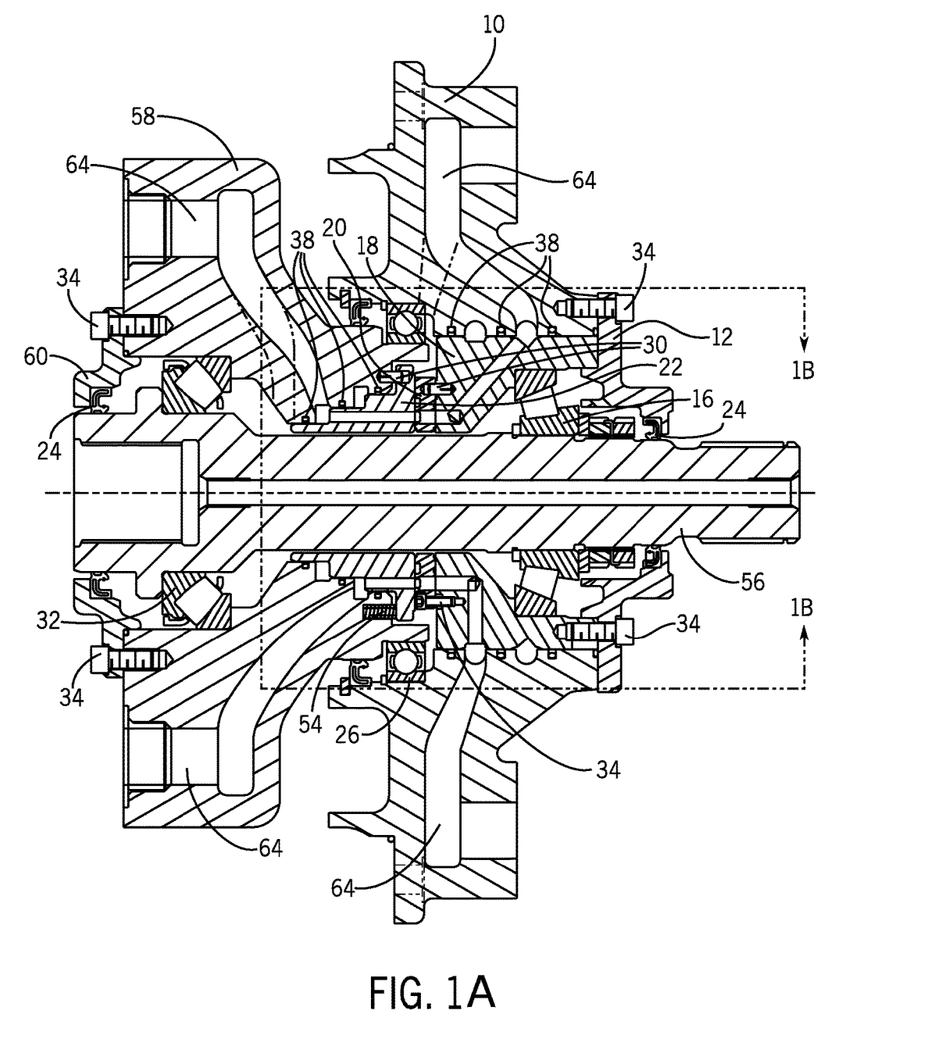
FIG. 1A is a cross-sectional view of a high-speed rotary of an embodiment of the present invention.
Figure 1B:
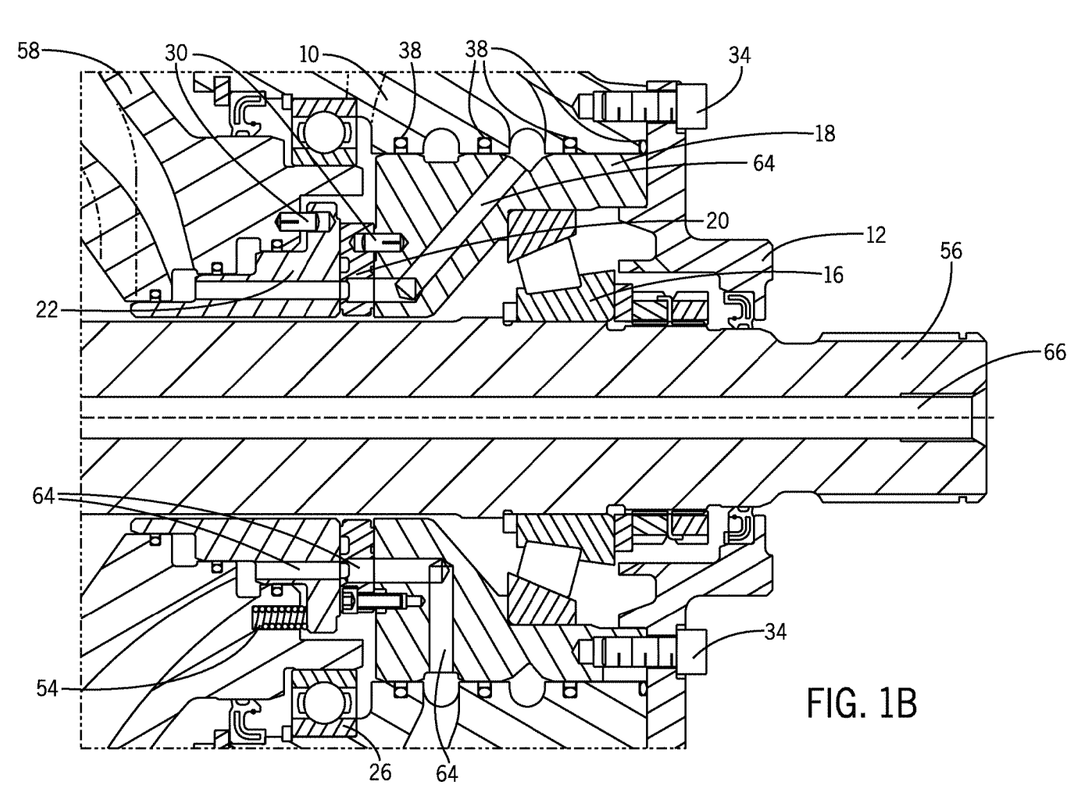
FIG. 1B is a detail cross-sectional view taken along line 1B-1B in FIG. 1A.
Figure 1C:
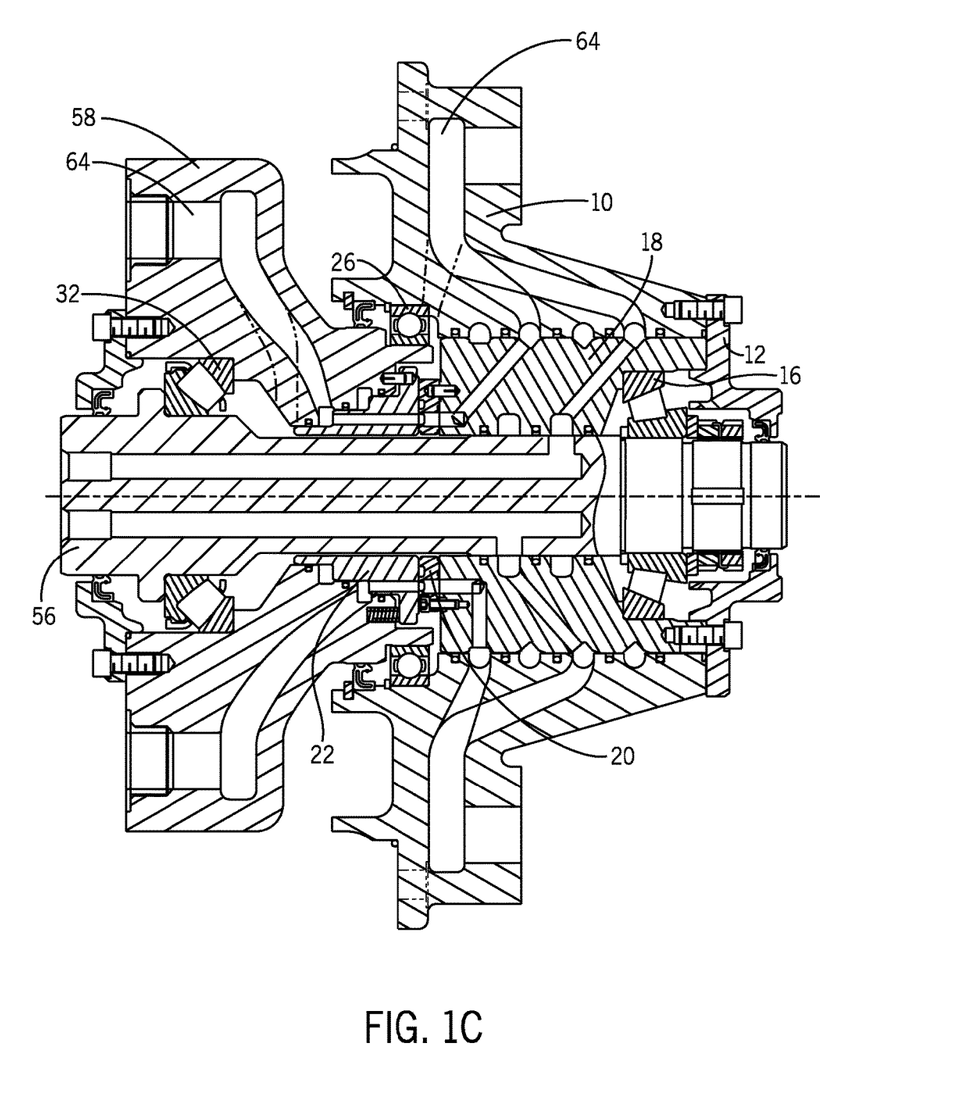
FIG. 1C is a cross-sectional view of an alternate high-speed rotary of an embodiment of the present invention.

The present invention includes a universal high-speed rotary union. The assembly of the present invention includes a supporting drive shaft with input and output splines and bearings which support electrical power input and output components. The function of the present invention is to facilitate collective and simultaneous supply of hydraulic and mechanical power between stationary or counter rotating assemblies. The shaft includes a hollow center to allow for electrical input and output to run therethrough by mounting a slip ring assembly in the threaded opening at the end of the shaft. The shaft can also be reconfigured for conventional low speed rotary union functionality to create a high speed and low speed combination design as illustrated in FIG. 1C.

The universal high-speed rotary union includes an input manifold, a distributor, a dual-path valve plate, an output receiver, and an output manifold. These assemblies provide passage for high pressure oil supply, low pressure oil return, and low pressure drain and lube return. The assembly includes an independent and simultaneous mechanical power input and output drive shaft. The slip ring allows the mechanical input and output shaft to rotate while, simultaneously, convey electric power or signal in and out of the rotary union assembly. High speed rotation implies radial and axial loading forces not present in static and swiveling situation which are isolated from or absorbed by the high-pressure sealing mechanism. The universal high-speed rotary union is capable of high pressure and high-speed axial conveyance of hydraulic, mechanical, and electrical power between stationary or counter rotating assemblies simultaneously. The assembly is sealed from atmospheric elements including rust because the internal components are continuously washed in oil.

In order to overcome the speed and pressure limitations in typical plastic, rubber or composite seal materials, axial piston motors and pumps utilize metal valve plates to commutate fluid between the stator and rotating output barrel. The metal valve plates commutate fluid between the input assembly group and the output assembly group of the rotary union. The metal dual path valve plate allows the assembly to achieve rotational speeds in the range of 450 rpm from 1000 psi to 5000 psi compared to 50 rpm at 1000 psi for typical composite seal rotary unions.

Typical application may include simultaneous conveyance of mechanical and hydraulic power in a wind turbine where the rotating blades convert wind power to mechanical power which is transmitted through the center shaft to the generator while hydraulic flow from a hydraulic pump in the transmission is transmitted back through the rotary union to control blade angle and turbine rotation speed. Other applications may include any large rotating mixing, crushing or sorting drum with internally powered secondary paddles or vibrators for refining materials. The secondary power can be controlled separately, if needed.

The present invention provides axial conveyance of mechanical and electrical power. Conveyance functions can be facilitated independently or simultaneously in any desired combination. The new design facilitates desired functions at higher speed and pressure combinations than conventional Dynamic Sealing Technology and Rotary Union assemblies. The metal to metal sealing technology using metal valve plates has been proven to facilitate high speed operation at high pressures in axial piston hydraulic pumps and motors.

The Universal High-Speed Rotary Union provides a high pressure and high rotation speed fluid transfer interface similar to an axial piston hydraulic motor or pump. The new design provides additional application versatility by providing simultaneous mechanical power input or output. Additionally, electrical power or signal can also be conveyed in and out of the assembly with the addition of a hollow supporting shaft, through which an electrical line can be channeled. The hydraulic, mechanical and electric functions can be utilized separately and independent of each other. The metal to metal hydraulic sealing surface of the bronze valve plate allows for high temperature, high pressure, long life and high rotating speeds associated with axial piston hydraulic pumps and motors.

Figure 2:
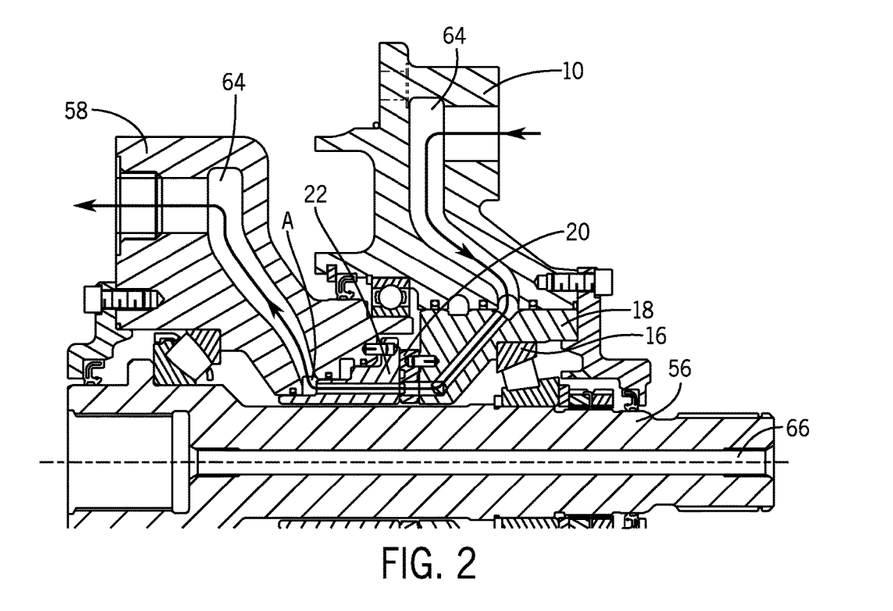
FIG. 2 is a detail cross-sectional view of a high-speed rotary of an embodiment of the present invention illustrating a flow path.
Figure 3:
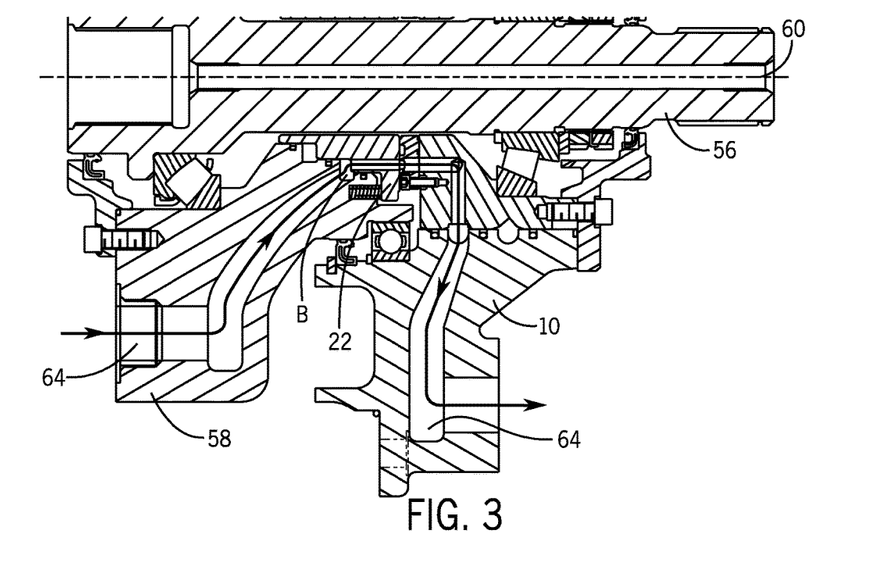
FIG. 3 is a detail cross-sectional view of a high-speed rotary of an embodiment of the present invention illustrating a flow path.
Figure 4A:
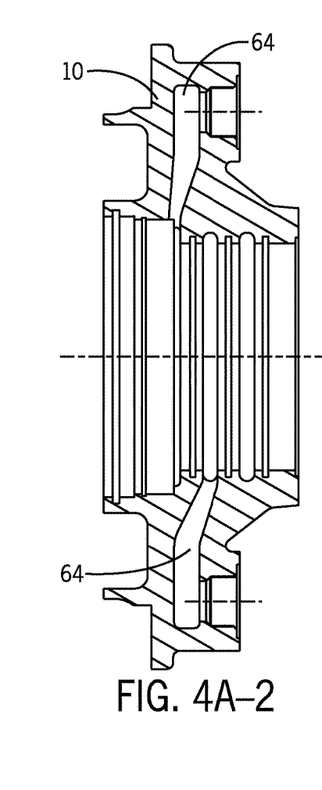
Figure 4A:
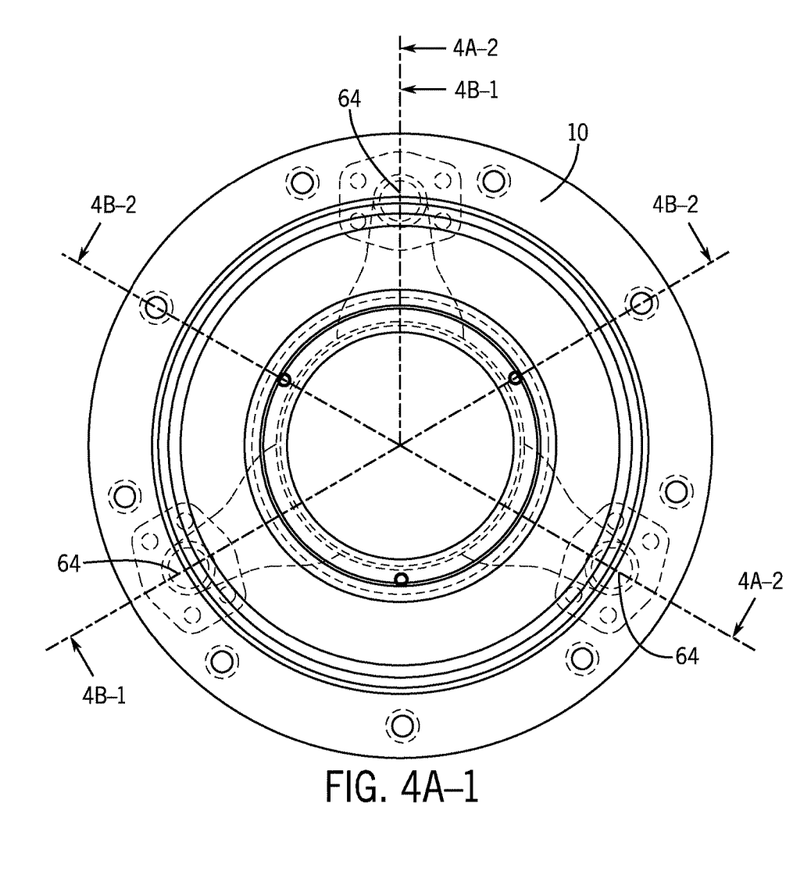
Figure 4B:
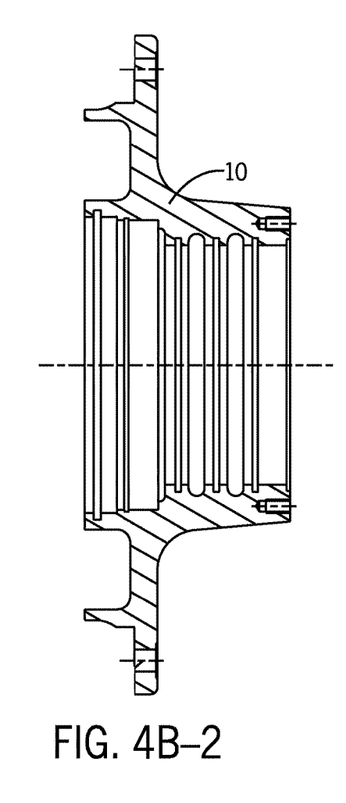
Figure 4B:
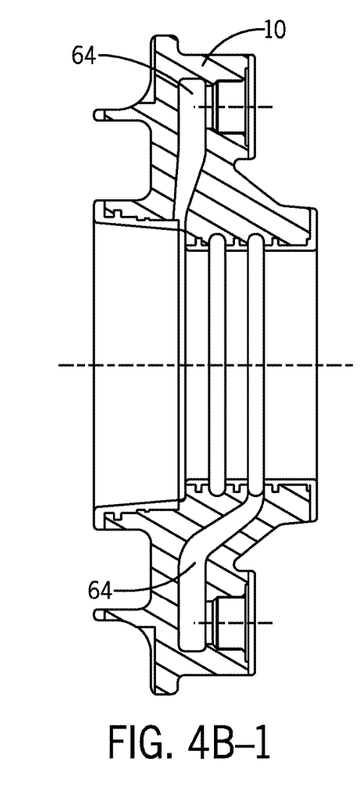
Figure 5A:
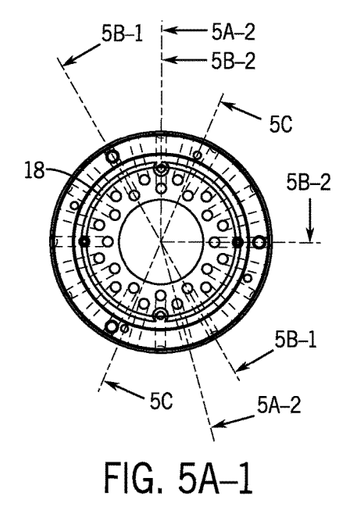
Figure 5A:
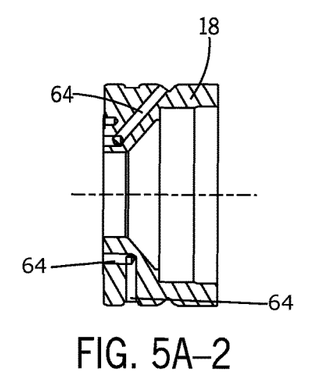
Figure 5B:
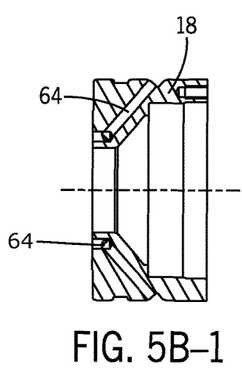
Figure 5B:
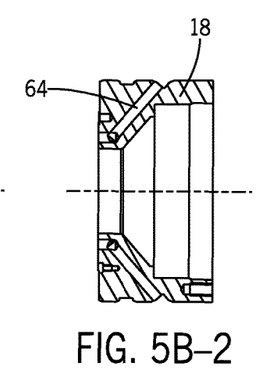
Figure 5C:
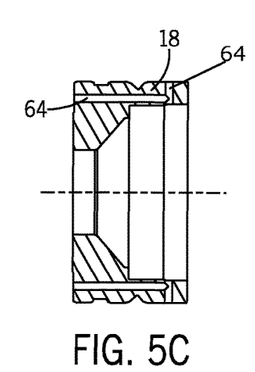
FIG. 5C is a cross-sectional view of the input manifold taken along line 5C of FIG. 5A-1.
Figures 8A, 8A:
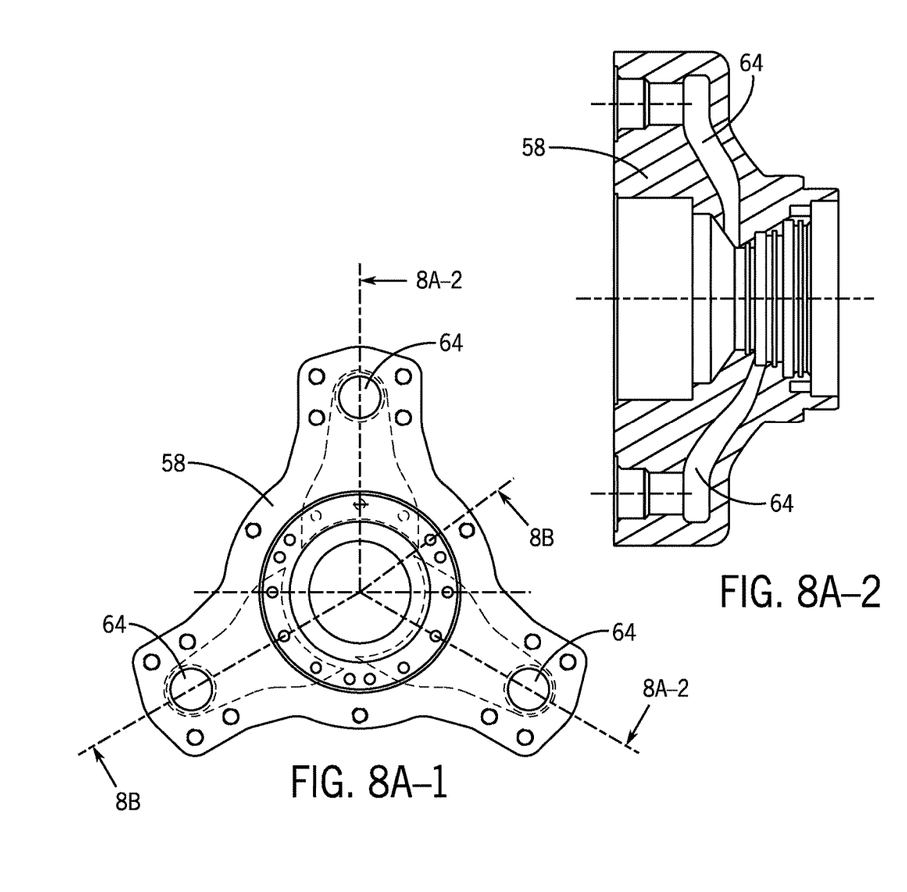
Figure 8B:
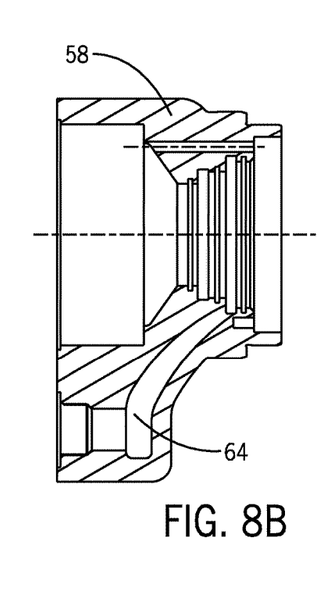
FIG. 8B is a cross-sectional view of the input manifold taken along line 8B of FIG. 8A-1.
Figure 9A:
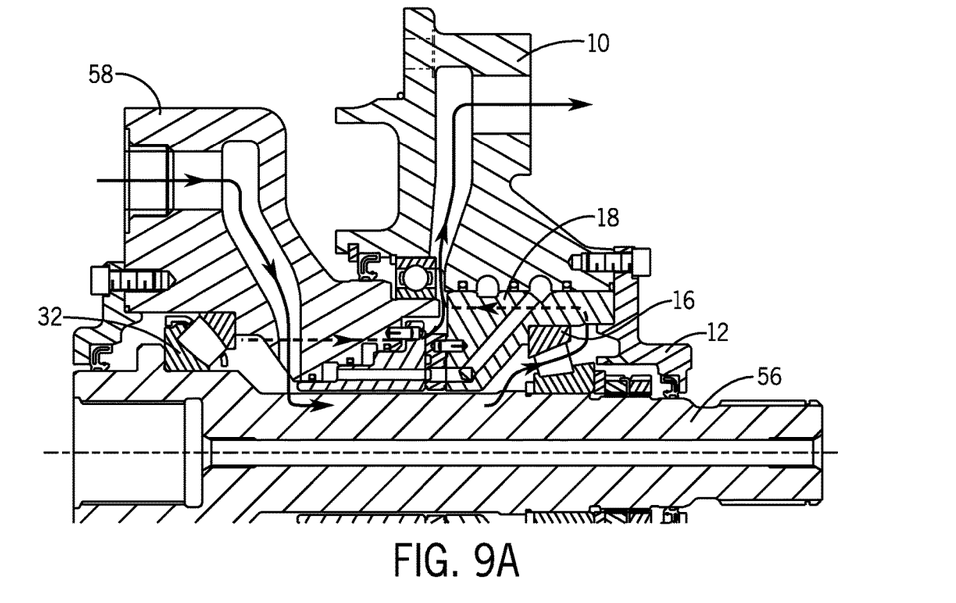
FIG. 9A is a cross-sectional view of a high-speed rotary of an embodiment of the present invention illustrating a drain return path.
Figure 9B:
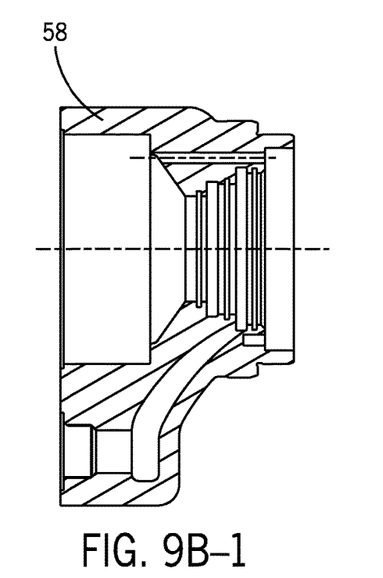
Figure 9B:
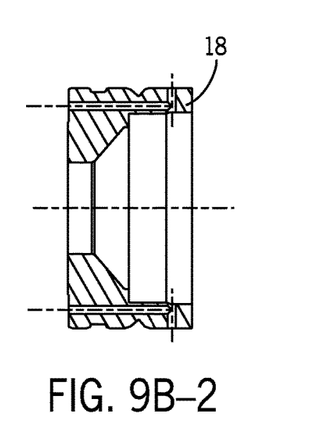
Figure 61:
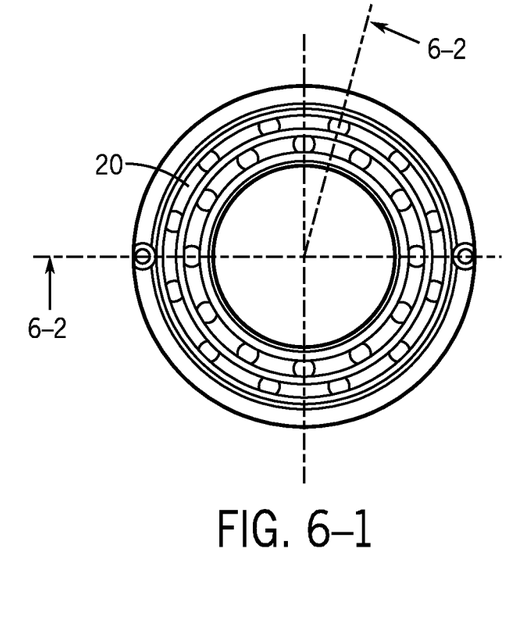
Figure 62:
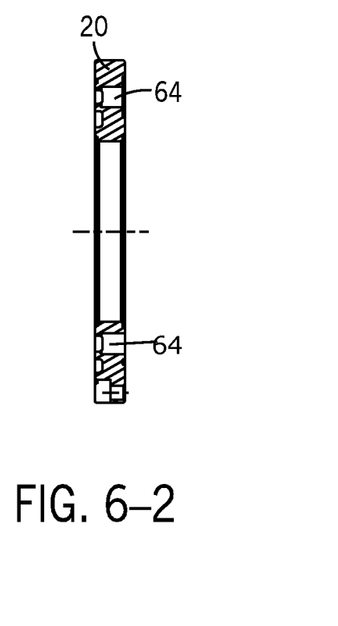
Figure 71:
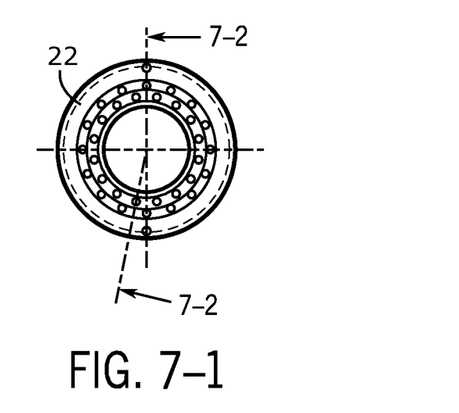
Figure 72:
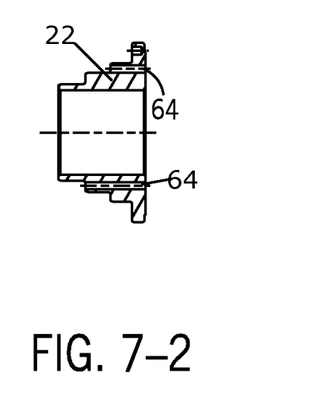

Referring to FIGS. 1 through 9, the present invention includes a universal high-speed rotary union. The rotary union includes an input manifold 10 which may be mounted and secured to a rigid frame and primary support. The input manifold 10 includes three fluid passageways 64. The fluid passageways 64 of the input manifold are illustrated in FIG. 4A-1 through FIG. 4B-2. Input pressure fluid path is illustrated in FIG. 2. Output/return pressure fluid path is illustrated in FIG. 3. Hydraulic oil or other appropriate fluids may be used with suitable materials and design modifications. Two passageways 64 are provided for pressurized oil supply and return or vice versa. A third passageways 64 is provided for channeling excess oil from seal leaks in the assembly to a suitable reservoir and/or cooler.

Pressurized supply and return oil flows from the input manifold 10 through an input distributor 18. The input manifold 10 and the input distributor 18 are separated by high pressure seals 38. The input manifold 10 and input distributor 18 are coupled together using fasteners 34 and an input cover 12. A valve plate 20 is coupled to the input distributor 18 using fasteners 34. Dowel pins 30 further connect the valve plate 20 and the input distributor 18 to prevent rotation of the valve plate 20 relative to the input distributor 18. The input distributor 18, valve plate 20, and an output receiver 22 have provisions for transmitting oil through two axial and concentric circles of passageways 64. The passageways 64 are illustrated in FIGS. 5A-1 through 7-2.

Pressurized oil continues to flow from the input distributor 18 through the valve plate 20, and an output receiver 22. At this point it is important to note the output receiver 22 rotates relative to the valve plate 20 which is part of stationary input assembly components.

From the output receiver 22 oil flows into an output manifold 58. The output manifold 58 and the output receiver 22 rotate as one unit coupled together by dowel pins 30. The output manifold 58 and receiver 22 are supported on a first bearing 16, a second bearing 26, and a third bearing 32, about a shaft 56. The first bearing 16 and the third bearing 32 allow the shaft 56 to rotate independently from the input assembly components and the output assembly components. The shaft 56 provides the option of mechanical power input to the shaft 56 through an external spline on the right and out through an internal spline on the left. An additional through hole 66 is bored in the shaft 56 for optional electrical power input/output or sensing. To complete the assembly, a first end cap 12 is coupled to the input manifold 10 by fasteners 34 and a first cap seal 14, and a second end cap 60 is coupled to the output manifold 58 by fasteners 34 and a second cap seal 24 to contain oil for internal lubricating. The oil is eventually drained to a reservoir for recycling and/or cooling. Physical design of the input and output manifolds 10, 58 may be altered based on the interface assembly configurations and size.

The purpose of this assembly is to allow the output manifold 58 and output receiver 22 to rotate at higher speed. In the present invention, the output receiver 22 is made of a metal material while the valve plate 20 is made of metal material. For example, the output receiver 22 may be made of steel and the valve plate 20 may be made of bronze or other rigid materials, such as steel with a bronze backing seal face. The valve plate contact surface on the output receiver 22 is heat treated or hardened so that the primary wear in the seal interface is on the bronze surface valve plate 20. The metal to metal seal interface between the valve plate 20 and output receiver 22 simultaneously allows high and low-pressure oil flow to a hydraulic load connected to the passageways 64 in the output manifold 58. The metal to metal sealing function is facilitated by the micro-meter surface finishes on both the valve plate 20 and output receiver 22.

The sealing force is proportional to the oil pressure. The sealing force is generated by pressure in cavity "A" (FIG. 2) and cavity "B" (FIG. 3) which is radially sealed by seals 28 on either side of the cavities. The sealing forces generated by pressures in cavities "A" and "B" move the output receiver 22 to seal against the valve plate 20. The output receiver 22 behaves like a floating piston to allow for automatic adjustment for wear of the valve plate seal surfaces. While this design has a dual-path valve plate 20, with input pressure and return passageways, a single or higher multiple passageways valve plate design can be installed for additional function capability. The pressure in the fluid allows for proportional leakage across the sealing surface to provide simultaneous lubrication and cooling of the friction surfaces. Tapered roller bearing 16 and tapered/spherical roller bearing 32 are designed to contain the axial forces generated by the pressure in cavities "A" and "B". In the absence of hydraulic pressure, the output receiver 22 is kept in constant contact with the valve plate 20 by multiple coil springs 54 mounted in cavities machined in the output manifold 58.

It should be understood, of course, that the foregoing relates to exemplary embodiments of the invention and that modifications may be made without departing from the spirit and scope of the invention as set forth in the following claims.

What is claimed is:

1. A universal high-speed rotary union comprising:
   an input manifold comprising passageways;
   an input distributor fixedly coupled to the input manifold and comprising passageways fluidly connected with the passageways of the input manifold;
   a valve plate fixedly coupled to the input distributor and comprising passageways aligned with the passageways of the input distributor;
   an output manifold rotatably coupled to the input manifold by a first bearing and comprising passageways and an internal housing;
   an output receiver slidably coupled to and disposed within the internal housing of the output manifold, and comprising passageways aligned with the passageways of the output manifold;
   a bore defined along a common axis of the input manifold, the input distributor, the valve plate, the output manifold, and the output receiver; and
   a shaft rotatably coupled within the bore by at least a second bearing, wherein
   the valve plate and the output receiver comprise a metal to metal interface.

2. The universal high-speed rotary union of claim 1, further comprising a plurality of seals disposed on either side of each of the aligning passageways.

3. The universal high-speed rotary union of claim 1, further comprising a seal disposed in between the input manifold and an output manifold.

4. The universal high-speed rotary union of claim 1, further comprising at least one spring biasing the output receiver against the valve plate.

5. The universal high-speed rotary union of claim 1, wherein the shaft comprises a through hole.

6. The universal high-speed rotary union of claim 1, further comprising a first end cap coupled to the input manifold and a second end cap coupled to the output manifold.

7. The universal high-speed rotary union of claim 6, wherein seals are disposed in between the shaft and the first end cap and the shaft and the second end cap.

8. The universal high-speed rotary union of claim 1, wherein the valve plate is made of bronze and the output receiver is made of steel.

9. The universal high-speed rotary union of claim 1, wherein contact surfaces of the valve plate and the output receiver are heat treated and hardened.

10. The universal high-speed rotary union of claim 1, wherein the contact surfaces of the valve plate and the output receiver each comprise micro-meter surface finishes.

\* \* \* \* \*